May 2, 1961
H. A. JOHNS
2,982,010
SLIP OFF PAINT ROLLER
Filed Oct. 8, 1956
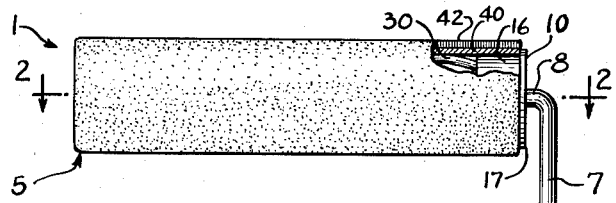
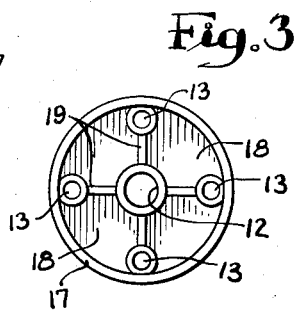
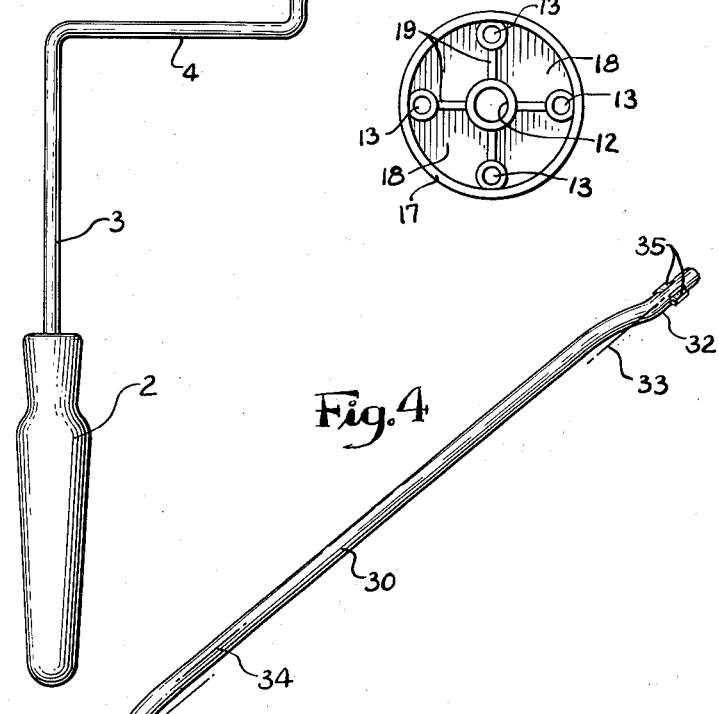
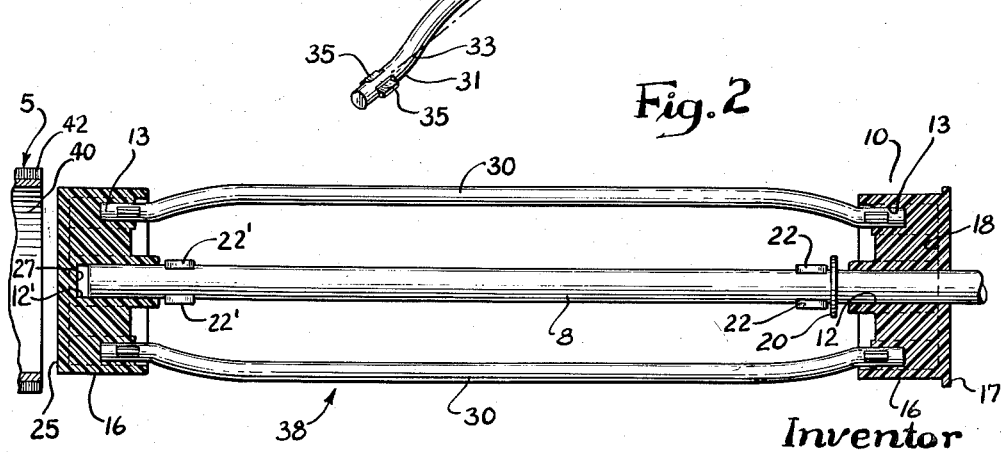
Inventor
HAROLD A. JOHNS
by: Morris Spector
atty.

United States Patent Office 2,982,010
Patented May 2, 1961

2,982,010

SLIP OFF PAINT ROLLER

Harold A. Johns, Chicago, Ill., assignor to Essex Graham Company, Chicago, Ill., a corporation of Illinois Filed Oct. 8, 1956, Ser. No. 614,481

3 Claims. (Cl. 29—116)

This invention relates to paint rollers and the like.

Paint rollers of the type with which the present invention is concerned generally consist of a handle carrying a journal shaft on which is rotatably mounted an open cage structure that is adapted to receive and hold an applicator sleeve by telescoping into the sleeve structure.

It is one of the objects of the present invention to provide an improved and economical cage structure that may be readily assembled on the handle structure and which will properly hold the sleeve applicator and yet permit ready removal and insertion of the sleeve applicator onto the cake structure. The preferred embodiment of the present invention herein illustrated comprises a cage having two end caps that are assembled on the handle structure on which they are journalled and are secured together by spring connecting or joining rods.

It is another object of the present invention to provide a cage structure of the above-mentioned character wherein the joining rods are press fitted into the end caps.

It is a further object of the present invention to provide a structure of the above-mentioned character wherein the end caps are made of a plastic molding that is adapted to receive and make a press fit with the joining rod by the act of physically pressing the ends of the joining rods into the end caps.

It is a still further object of the present invention to provide a structure of the above-mentioned character wherein the joining rods are locked to the end caps to hold the joining rods against axial rotation with respect to the end caps, all by the mere pressure insertion of the spring joining rods into the end caps.

The attainment of the above and further objects of the present invention will be apparent from the following specification taken in conjunction with the accompanying drawing forming a part thereof.

In the drawing:

Fig. 1 is a front view of a paint roller embodying the present invention, with parts thereof broken away;

Fig. 2 is a sectional view taken along the line 2—2 of Fig. 1 and looking in the direction of the arrows;

Fig. 3 is an inside face view of one of the end caps; and

Fig. 4 is a perspective view of one of the joining rods.

In the drawing, like reference numerals designate like parts throughout.

The paint applicator or roller 1 of the present invention comprises a handle 2 having a comparatively stiff rod 3 secured thereto which is bent at substantially right angles to provide a portion 4 that parallels the longitudinal axis of the rotatable sleeve structure 5 that constitutes a hollow tubular applicator known in the art. The portion 4 is then bent at right angles, as indicated at 7, and then bent again to form a portion 8 that constitutes a journal rod for the sleeve structure, all as known in the art. The journal rod 8 is circular in cross section and has an inner end cap 10 journalled thereon. The inner end cap 10 is a plastic molding of a circular shape and has a central bore 12 that fits over the applicator rod snugly but sufficiently loose to permit free rotation of the inner end cap 10 on the journal rod. The inner end cap has four cylindrical sockets 13 formed therein and spaced 90° apart. These sockets are open at one end of the end cap and closed at the other and circular at the cross section and with their longitudinal axes parallel to the longitudinal axis of the central bore 12 and uniformly spaced about the center of the bore 12. The end cap 10 also has an outer cylindrical surface 16 terminating in a circular peripheral flange 17. The side of the end cap 10 that is closest to the portion 7 of the handle structure is closed, as indicated at 18. A plurality of webs 19 integral with the closed end 18 join the bore 12 with the sockets 13.

After the inner end cap 10 has been placed on the journal rod 8 a short circular washer 20 is also placed on the journal rod. Thereafter the journal rod is deformed by stamping therefrom two short wings 22—22 that are 180° apart and project radially of the rod 8. The wings constitute stops for the washer, which in turn constitutes a stop limiting axial movement of the inner end cap 10 in a direction to the left as seen in Fig. 2, which is in a direction for movement off of the journal rod 8. At the same time similar wings 22'—22' are formed adjacent to the opposite end of the journal rod 8.

An outer end cap 25 is provided which is similar to the inner end cap 10, differing therefrom only in that a central circular bore 12' therein, which corresponds to the bore 12 of Fig. 2, extends only part way through the outer end cap 25 instead of entirely through the end cap, and further that the flange 17 of the cap 10 is here omitted. The bore 12' is closed at one end by a bore wall 27, the front wall of the outer cap being imperforate. In all other respects the outer end cap 25 is of identical construction with the construction of the inner end cap 10 and of the same plastic molding.

Four spring metal joining rods or tie rods are provided for securing the inner and outer end caps together. These joining rods are made preferably of spring steel and are circular in cross section. The two opposite ends of each joining rod are bent, as indicated at 31—32, with the longitudinal axis 33 of the end 31 coincident with the longitudinal axis 33 of the end 32, the axes 33 being parallel to and offset from the longitudinal axis 34 of the straight portion 30 of the rod. The bent ends 31—32 are further deformed so that each is provided with a pair of short, outwardly extending wings 35—35 that are 180° apart, which wings project beyond the periphery of the ends 31—32.

The ends 31 of respective spring joining wires 30 are press fitted one into each of the four sockets 13 of the outer end cap 25 in such a position that the offset between the axes 31 and 34 is in a direction radially of the end cap 25. The ends 31 make a tight fit within the respective sockets, and the wings 35 bite into the walls of the socket 13 to hold the spring wire 30 against axial rotation within the socket. The material of the end cap 25 is such that the wings 35 can dig into the wall of the socket. The individual spring joining wires 30 are thus positively held in the end caps.

The end cap 25 with the spring wires assembled thereon is then brought into position for insertion over the end of the journal rod 8 at which time the ends 32 of the joining wires 30 are opposite each of the sockets 13 of the inner end cap 10. The two end caps are then forced together, thus pressing the ends 32 of the four wires each into the corresponding one of the sockets 13 and causing the wings 35—35 at that end of each joining wire to bite into the peripheral wall of its socket 13 of the inner end cap. Each of the four joining wires 30 is thus locked at one end to the inner end cap and at the opposite end to the outer end cap, whereby those four wires together with the end caps constitute a cage structure 38 journalled on the journal rod 8 and irremovable therefrom except by the exertion of a very great force applied to the two end caps in a direction to pull them apart.

An applicator tube 5 may now be telescoped over the cage 38. The applicator tube 5 is of a conventional construction and includes an inner comparatively rigid circular sleeve 40 of an inside diameter such as to enable it to make a snug sliding fit over the outer cylindrical surfaces 16 of the inner and outer end caps, and outer fuzzy sleeve 42 secured to the inner sleeve 40. The applicator structure 5 is slipped over the outer end cap 25 and over the cage 38 and over the cylindrical surface 16 of the inner end cap 10 until it abuts against the circular peripheral flange 17.

The offset in each spring joining wire 30 is such that a circle of a minimum diameter for circumscribing the four spring wires 30 is of greater diameter than the diameter of the cylindrical surface 16 and of greater diameter than the internal diameter of the sleeve 40. As the sleeve 40 is being inserted on the applicator it compresses the spring wires 30 radially inwardly. As a result, the spring wires exert a radially outward spring pressure on the sleeve 40 and hold the sleeve 40 releasably against retraction. The applicator 40, may, however, be readily slipped or removed from the cage 38 by the application of the necessary force thereto.

In compliance with the requirements of the patent statutes I have here shown and described a preferred embodiment of my invention. It is, however, to be understood that the invention is not limited to the precise construction here shown, the same being merely illustrative of the principles of the invention. What I consider new and desire to secure by Letters Patent is:

1. A paint roller of the type including a journal rod having a free end and on which is journalled a cage that is adapted to be telescoped into and frictionally hold a hollow tubular paint applicator, said cage comprising an inner circular end cap having a central bore therethrough through which the rod extends, the cap being journalled on the journal rod at a point thereof remote from its free end, an imperforate outer circular end cap having a centrally located bore extending only part way therethrough into which extends the fill end of the journal rod to journal the outer end cap on the journal rod, the two end caps being of the same outside diameter, each of the two caps having, at the surfaces facing one another, axially extending sockets uniformly spaced from one another around the center of the cap, the sockets of the inner cap being identically spaced with respect to the sockets of the outer cap, corresponding sockets of the two caps being connected by respective spring joining rods each press fitted at one end into a socket in the inner end cap and at its opposite end into a socket in the outer end cap, said joining rods thereby securing the two end caps together to form a cage, the journal rod having an offset adjacent said remote point thereof and located adjacent to the inner face of the inner end cap to confine the cage against axial movement on the journal rod in a direction for retracting it from the free end of journal rod, cooperating stop means between the cage and said journal rod for limiting axial movement between the two in the opposite direction, each of said spring rods being bent between its ends to project from the center of the journal rod an amount exceeding the radius of the end caps, whereby upon telescoping of the cage into a tubular paint applicator that makes a tight fit over the end caps the spring joining rods are pressed inwardly and exert a spring holding pressure against the applicator, each end cap being an integrally formed plastic molding, and means extending laterally from the spring rods and wedging into the walls of the sockets for locking the rod ends against rotation in their sockets.

2. A paint roller of the type including a journal rod having a free end and on which is journalled a cage that is adapted to be telescoped into and frictionally hold a hollow tubular paint applicator, said cage comprising an inner circular end cap having a central bore therethrough through which the rod extends, the cap being journalled on the journal rod, an imperforate outer circular end cap having a centrally located bore extending only part way therethrough into which extends the free end of the journal rod to journal the outer end cap on the journal rod, the two end caps being of the same outside diameter, each of the two caps having, at the surfaces facing one another, axially extending sockets uniformly spaced from one another around the center of the cap, the sockets of the inner cap being identically spaced with respect to the sockets of the outer cap, corresponding sockets of the two caps being connected by respective spring joining rods each press fitted at one end into a socket in the inner end cap and at its opposite end into a socket in the outer end cap, said joining rods thereby securing the two end caps together to form a cage, each of said spring rods being bent between its ends to project from the center of the journal rod an amount exceeding the radius of the end caps, and each spring joining rod providing integral laterally extending wing means at each end thereof frictionally engaging the associated socket to lock the spring rod against rotation in the socket, whereby upon telescoping of the cage into a tubular paint applicator that makes a tight fit over the end caps the spring joining rods are pressed inwardly and exert a spring holding pressure against the applicator, each end cap being an integrally formed plastic molding.

3. A paint roller of the type including a journal rod having a free end and on which is journalled a cage that is adapted to be telescoped into and frictionally hold a hollow tubular paint applicator, said cage comprising an inner circular end cap having a central bore therethrough through which the journal rod extends, the cap being journalled on the journal rod at a point thereof remote from its free end, the journal rod having an offset adjacent said remote point thereof to confine the end cap against axial movement on the journal rod in a direction for retracting the end cap from the free end of the journal rod, an imperforate outer circular end cap having a centrally located bore extending only part way therethrough into which extends the free end of the journal rod to journal the outer end cap on the journal rod, the two end caps being of the same outside diameter, each of the two caps having, at the surfaces facing one another, axially extending sockets uniformly spaced from one another around the center of the cap, the sockets of the inner cap being identically spaced with respect to the sockets of the outer cap, corresponding sockets of the two caps being connected by respective spring joining rods each press fitted at one end into a socket in the inner end cap and at its opposite end into a socket in the outer end cap, said joining rods thereby securing the two end caps together to form a cage, each of said spring rods being bent between its ends to project from the center of the journal rod an amount exceeding the radius of the end caps, whereby upon telescoping of the cage into a tubular paint applicator that makes a tight fit over the end caps the spring joining rods are pressed inwardly and exert a spring holding pressure against the applicator, and means carried by each spring rod at each end thereof and being in wedging engagement with the associated end receiving socket to lock the spring rod end against rotation in the socket, each end cap being a one piece member.

References Cited in the file of this patent

UNITED STATES PATENTS

| | | |
|---|---|---|
| 1,841,688 | Vlchek | Jan. 19, 1932 |
| 2,563,048 | Liebelt et al. | Aug. 7, 1951 |
| 2,715,926 | Harris | Aug. 23, 1955 |
| 2,741,013 | Messmer | Apr. 10, 1956 |
| 2,749,599 | Kreger | June 12, 1956 |
| 2,758,364 | McMillan | Aug. 14, 1956 |
| 2,766,473 | Thackara | Oct. 16, 1956 |

UNITED STATES PATENT OFFICE
CERTIFICATE OF CORRECTION

Patent No. 2,982,010 May 2, 1961

Harold A. Johns

It is hereby certified that error appears in the above numbered patent requiring correction and that the said Letters Patent should read as corrected below.

Column 3, line 64, for "fill" read -- free --.

Signed and sealed this 17th day of October 1961.

(SEAL)
Attest:

ERNEST W. SWIDER
Attesting Officer

DAVID L. LADD
Commissioner of Patents
USCOMM-DC